United States Patent [19]
Kronenberg

[11] 4,369,493
[45] Jan. 18, 1983

[54] RESPONSE TIME MONITOR

[75] Inventor: Allan A. Kronenberg, Commack, N.Y.

[73] Assignee: Metropolitan Life Insurance Company, New York, N.Y.

[21] Appl. No.: 38,988

[22] Filed: May 14, 1979

[51] Int. Cl.³ .................. G06F 3/00; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,599,091 | 8/1971 | Warner, Jr. | 324/73 |
| 3,763,474 | 10/1973 | Freeman et al. | 340/172.5 |
| 3,771,144 | 11/1973 | Belady et al. | 364/200 |
| 3,818,458 | 6/1974 | Deese | 364/200 |
| 4,070,702 | 1/1978 | Grants et al. | 364/200 |

FOREIGN PATENT DOCUMENTS

| | | |
|---|---|---|
| 1207022 | 9/1970 | United Kingdom . |
| 1422603 | 1/1976 | United Kingdom . |
| 1444314 | 7/1976 | United Kingdom . |
| 1458200 | 12/1976 | United Kingdom . |
| 1492139 | 11/1977 | United Kingdom . |
| 1508731 | 4/1978 | United Kingdom . |
| 1541723 | 3/1979 | United Kingdom . |

OTHER PUBLICATIONS

Performance Monitoring System – Model 500 – a four page flyer describing a device of Questronics, Inc.
1 page Search Report dated Sep. 9, 1980 from the Patent Office, London, England in corresponding British Application Serial No. 15748/80.
Printing Response Time Monitor – Model PRTM – a four page flyer describing a device of Questronics, Inc.
Response Time Monitor – Model 300 – a two page flyer describing a device of Questronics, Inc.
Response Time Monitor – Model TRTM – a two page flyer describing a device of Questronics, Inc.

*Primary Examiner*—Gareth D. Shaw
*Assistant Examiner*—John G. Mills
*Attorney, Agent, or Firm*—Kenyon & Kenyon

[57] ABSTRACT

Method and apparatus for inserting data, such as the result of interactive response time measurements, into a terminal of a computer system. The measurements can be made independently of programming of the computer in response to a control signal in the terminal. The resulting data is fed into the input data stream transmitted from the input keyboard of the terminal to data storage in the terminal for use in the terminal and in the computer system.

11 Claims, 4 Drawing Figures

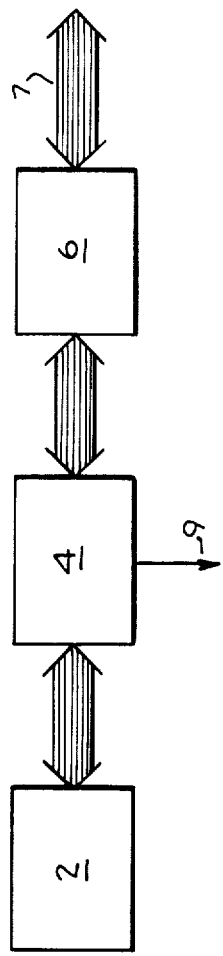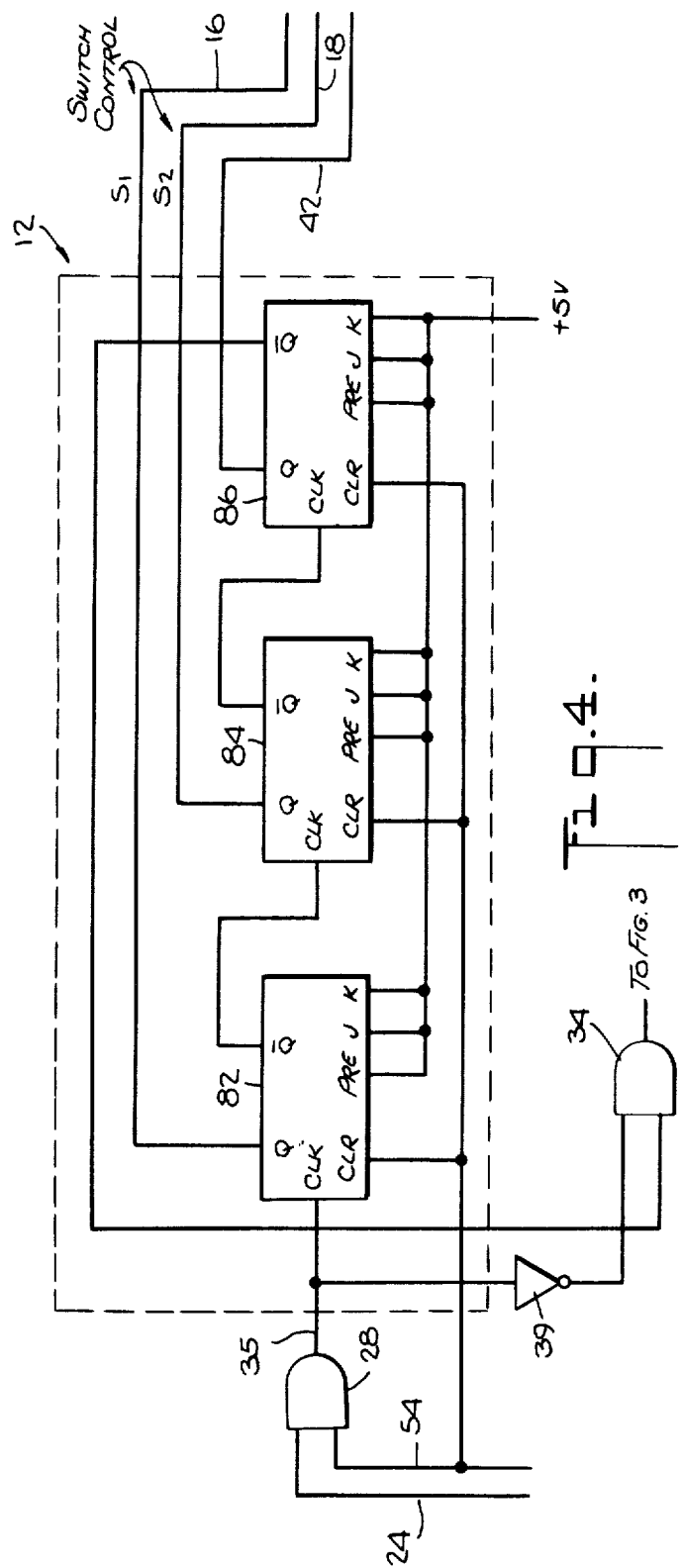

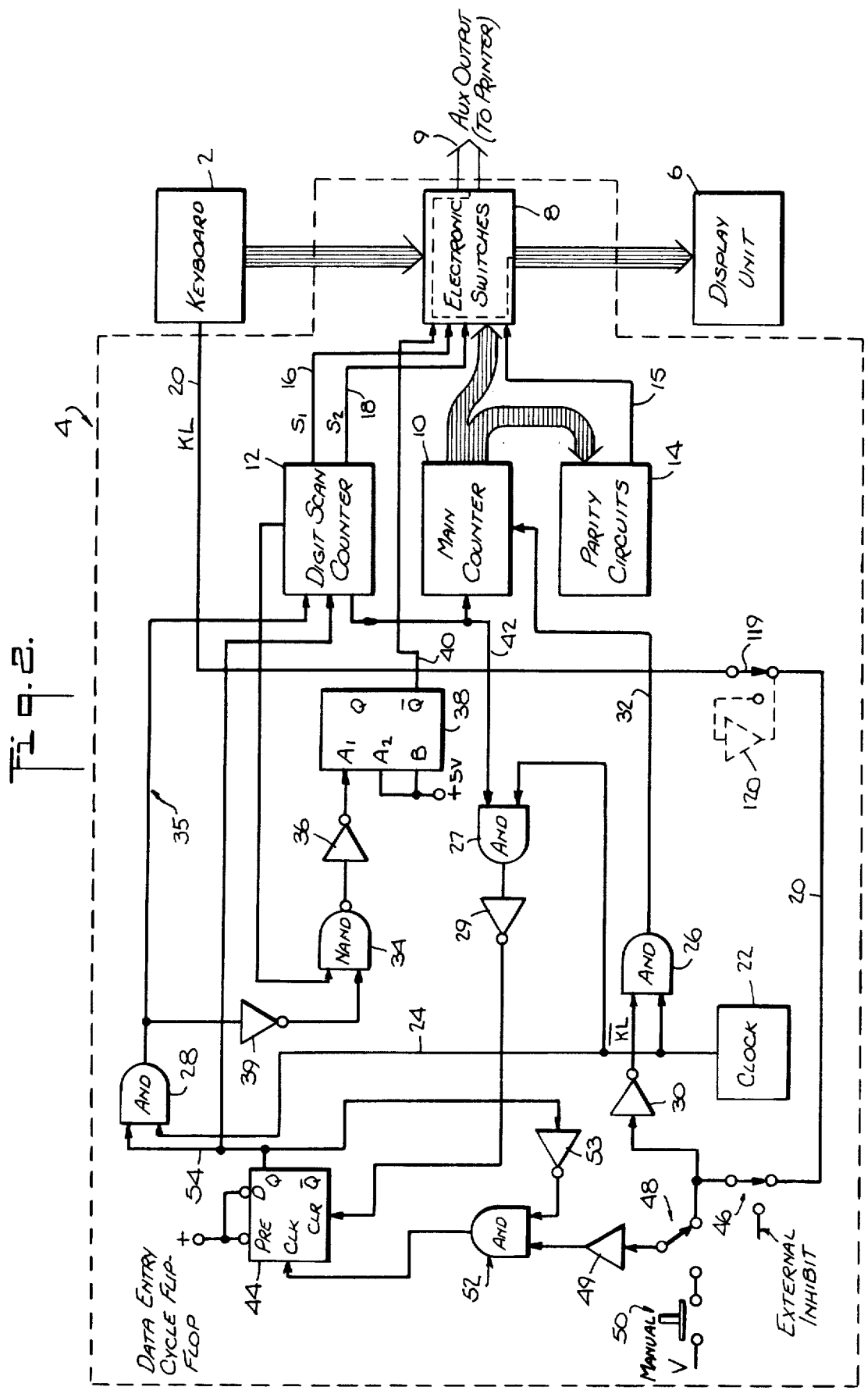

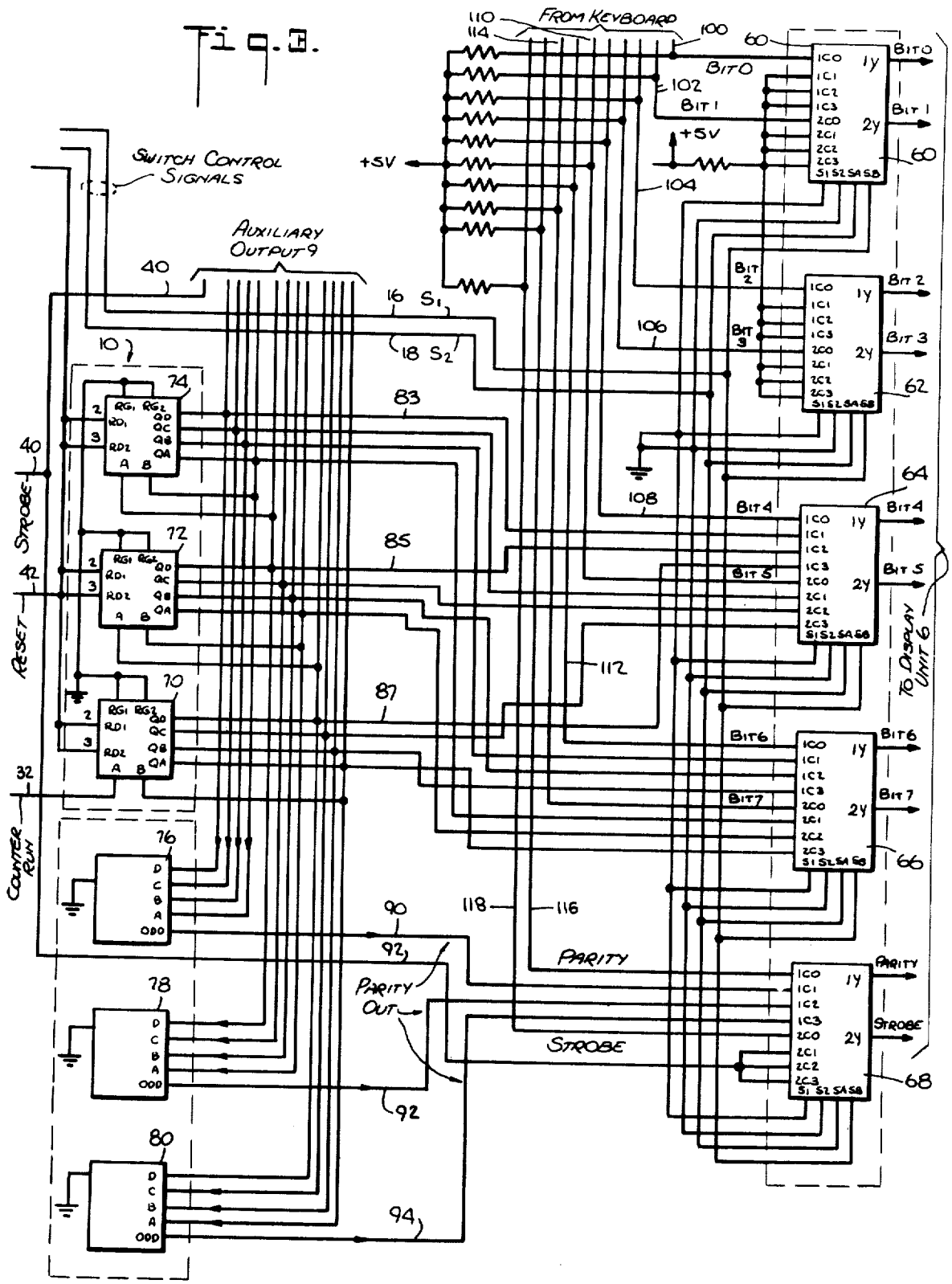

RESPONSE TIME MONITOR

BACKGROUND OF THE INVENTION

1. Field of the Invention

This invention relates to electronic data processing apparatus. More specifically, it relates to means responsive to signals being transmitted between a computer and a display unit having a keyboard for measuring the response time of the computer, that is, the time required for completion of a computer activity.

2. Discussion of the Prior Art

Many forms of data processing systems are known in the art which include data input equipment, a central processor, a memory and output devices, such as printers, punches, memories, and the like. In these systems, data which is either stored in the system or entered into the system by an operator, for example by a keyboard, is manipulated in accordance with predetermined programs, and then the completed work is displayed visually or in a printout or otherwise recorded for later use. In large scale systems of this general type, use is frequently made of terminals, placed in different locations for the convenience of the user, by means of which many different users can have access to the computer for the performance of the variety of data processing operations which may be programmed into the computer. Because of the high cost of acquiring and operating computer equipment, it is desirable for the organization using the computer to have accurate cost information regarding the time that it takes the computer to perform each operation fo each different user in order to enable the organization to allocate and control the cost of using the equipment most effectively.

For this purpose, it is desirable to know the actual operating or response time the computer takes to complete a particular process. This information should be made available at the computer terminal, as part of the information displayed, or as a printout, when such is needed.

The need for computer process time measurement capabilities of the type discussed above has been recognized in the computer industry and arrangements in which operation of timing circuitry in the computer is controlled by programmed instructions are known.

There is a need, however, for a simple, inexpensive auxiliary equipment which can be added to existing systems for performing this function.

One auxiliary system is known, which may be attached to a computer and which depends for its operation on the "system available" status symbol which is flashed on the viewing screen of the terminal when a particular operation is completed. The "system available" or "system inhibit" signals used in a display terminal are usually in the nature of a spot and may, for example, be made up of several horizontal lines of the video raster having a length equal to the width of an alphabet character, which appear at a location on the right hand side of the screen. In the prior art auxiliary system, a photoelectric cell is applied to the face of the cathode ray tube to detect the light from the status symbol. When the symbol is detected, a microprocessor, separate from the computer being measured, processes the signal from the photocell. For such processing it may be necessary to compensate for variations in the signal strength resulting from the software used, for scan characteristics, for changeable refresh rates, for spot brightness and duration, and for other system characteristics which influence the brightness of the spot. This system is complex and its performance is easily affected by failure to compensate precisely for the system variables just mentioned.

It is an object of the present invention to use one or more signals generated by a computer for measuring the time it takes the computer to complete a particular operation.

Another object of the invention is to provide a reliable and convenient system of measurement for use at a computer terminal which is also capable of supplying the information generated to the central processor.

SUMMARY OF THE INVENTION

The present invention uses a signal generated at the terminal keyboard when the "Enter" key is depressed to initiate counting of internally generated clock pulses in a main counter. The process related control used for this purpose is a "keyboard lock signal," directed to the keyboard from the terminal visual display unit to prevent operation of the keyboard from affecting the computer during completion of the work in process. Once begun, counting of the pulses continues as long as the "keyboard lock signal" remains in effect. The measurement process ends when the keyboard is released at the end of the process and signals are generated in response to elapsed time information stored in the main counter and are coded and supplied to the display in the same form as from the keyboard so that the response time information appears in normal decimal sequence on the face of the cathode ray tube at the end of the measurement cycle. Read-out to the display unit begins when the timing measurement ends. A second counter generates binary signals which control the operation of electronic switches connected in the circuits between the keyboard and the display by which signals, coded in the proper form, are supplied to the display input wiring for translation by the display into visual timing data. An auxiliary output is provided for operating a separate printer, and provision is made for selection of keyboard lock signal or like information from a source other than the terminal to which the timing equipment is connected.

In the preferred embodiment described above, the timer circuit of the invention is illustrated in connection with a computer.

BRIEF DESCRIPTION OF THE DRAWINGS

FIG. 1 is a block diagram showing an illustrative embodiment of the invention;

FIG. 2 is a schematic diagram illustrating the logic activating the main counter and electronic switch of the response time monitor of FIG. 1;

FIG. 3 is a schematic diagram of the main counter and the electronic switch of FIG. 2; and FIG. 4 is a block diagram of a digit scan counter useful in the circuit of FIG. 1.

DETAILED DESCRIPTION OF THE INVENTION

Reference is made to FIG. 1 in which a keyboard 2, connected through response time monitor 4, supplies control signals to the visual display unit 6. For the sake of illustration, the teachings of the present invention are illustrated herein in connection with a response time monitor realized in connection with a type 3277 Interactive Terminal which is produced by the International Business Machines Corporation and which is connected, via a type 3271 controller connected to line 7, to a central computer. The response time monitor is connected between the keyboard and display units of the Interactive terminal by opening the connector in the cable which joins them and by inserting appropriate female and male connectors, connected to the monitor, as will be understood by those skilled in the art. In FIG. 1 this has been done and, with response time monitor 4 in the circuit, signals between keyboard 2 and the display are transmitted through the monitor unit by means of the illustrated connections. In operation, "system available" and "system inhibited" signals are transmitted to and made visible on the screen of display 6 indicating whether the keyboard may be used or is disabled.

Whether or not the keyboard is disabled depends upon a keyboard lock signal which is generated in the computer system. When a keyboard lock signal is transmitted from display unit 6 to keyboard 2, monitor 4 is activated and, when the computer process has been completed, the time measurement which was thus initiated is stopped. The monitor then transmits the amount of time so measured to display 6 in the same format as signals from the keyboard where it may be retained in storage until polled by the computer. Thus, the response time information becomes a part of the normal data flow between keyboard and main computer, and each transaction entered by the operator will have the response time information for the prior transaction appended to it. The information thereby automatically becomes available to the main computer where it may be stored and or processed as part of the normal data processing trail. This obviates any requirement for manual intervention or ancillary means of data collection. This information is also available to the central computer system via the link from the Interactive Terminal and needs only to be called for by the computer.

The structure of response time monitor 4 is shown in more detail in the block diagram of FIG. 2. There, it can be seen that the main interconnection between keyboard 2 and display unit 6 is provided by an electronic switch 8. There is also provided an auxiliary output 9 for connecting signals to a printer, for example, to make permanent local record of the data. The operation of electronic switch 8 is controlled by signals $S_1$ and $S_2$, transmitted on lines 16 and 18, respectively, to choose signals from keyboard 2 or, when a time measurement has been completed, from main counter 10. Parity circuits 14 are also fed by counter 10 for generation of parity signals which are transmitted to display 6 to provide appropriate parity information related to the activity of counter 10, as will be understood by those skilled in the art.

Control of the counting and signal generation circuitry is initiated by means of a keyboard lock signal transmitted on line 20 from keyboard 2 to the logic circuitry shown at the left of FIG. 2. The measurement system employs a master clock 22 which is a free-running multi-vibrator operating at 10Hz. The square wave output of clock 22 is supplied by line 24 to one input each of AND gates 26 and 28. The other input of AND gate 26 is supplied, via inverting driver 30, with $\overline{KL}$ signals which are the inverted form of keyboard lock signals KL supplied by line 20. Line 32 from AND gate 26 is connected to main counter 10; provision is thus made for control of the supply of clock pulses to main counter 10 by the keyboard lock signal.

The 10Hz clock signal fed to AND gate 28 is also gated into digit scan counter 12 via connecting line 35. It thus serves as the base for generation of switch control signals S1 and S2. Clock pulses are also fed from the output of gate 28, via inverting amplifier 39, NAND gate 34 inverting amplifier 36, and flip-flop 38, to provide strobe pulses for transmission on line 40 to electronic switch 8. The strobe pulse activates display unit 6 after selection of each digit of the timing measurement to be displayed. Just prior to generation of the strobe pulse, digit scan counter 12 also generates a "master reset" pulse which resets digit scan counter 12, and, via connecting line 42, main counter 10, and data entry cycle flip-flop 44.

Provision is made for selection of keyboard lock signal or like information from a source other than the terminal to which the timing equipment is connected. Control of the counting and signal generation circuitry is initiated by means of a keyboard lock signal transmitted on line 20 from keyboard 2 to the logic circuitry shown at the left of FIG. 2.

Keyboard lock signal KL is supplied, via inverting driver 30, to "counter run" gate 26, from the pin of single-pole, double-throw, "inhibit select" switch 46. This switch may be operated to choose between keyboard lock signal KL or an inhibit signal supplied from an external source, connected to the other terminal of the switch. Whichever signal is chosen, (in FIG. 2, the KL signal), is fed from switch 46 to manual-automatic switch 48. By operation of switch 48, choice may be made of whether push button 50 or keyboard lock signals KL will cause the transfer of the timing information to the display. As shown, switch 48 is in the internal cycle scan operate position, and the keyboard lock signals KL are fed, via digit scan gate 52, to data entry cycle flip-flop 44.

At the end of the response time interval, keylock signal KL goes high, clock pulses are no longer transmitted by AND gate 26 to main counter 10, and the data entry cycle is begun. During the data entry cycle, the response time stored in main counter 10 is scanned out into display unit 6 and appears to the display unit to be normal keyboard signals. "D" type flip-flop 44, which controls the data entry operation, is set; once "set", it cannot be reset until a reset signal is received on line 42. Activation of flip-flop 44 by keyboard lock signal KL results in application of a signal from the Q output of the flip flop to one input of gate 28, via line 54, as well as to an input of digit scan gate 52, via inverter 53. As a result, clock pulses are transmitted on line 35 from clock 22 to digit scan counter 12, and a holding signal is applied to gate 52 to inhibit further input transitions of data entry cycle flip flop 44 until the end of the scan cycle.

Reference is now made to FIG. 3 which shows detail of a circuit for transmitting the count stored in main counter 10 either through electronic switch 8 to display unit 6 or, separately, to auxiliary output 9 for use by an external printer or the like.

Shown in FIG. 3 are electronic switch 8, which contains five Dual 4-Input Multiplexers 60, 62, 64, 66, and 68, constituting the individual switches. Also shown are decade counters 70, 72 and 74, which comprise the main counter 10. Decade counters 70, 72 and 74 may be of the Divide-By-2 and By-5 type. In addition, there are parity generators 76, 78 and 80. These may be 9-Bit Odd/Even Parity Checker/Generators. Counters 70, 72 and 74 are connected in cascade, and clock pulses from AND gate 26 are applied to the input of first counter stage 70 via line 32. The outputs of the counters are in binary-coded decimal form, so that, when first counter 70, the tenths counter, changes from a count of 9 to 0, a signal is conveyed from the QD output of counter 70 to the input of counter 72, causing it to advance one count. Similarly, the QD output signal from second counter stage 72 drives third counter stage 74. Since the clock rate is ten pulses per second, the first stage of counter 10 advances the second counter stage once per second, and the second stage advances the third stage once every ten seconds. A timer having a maximum count of 99.9 seconds is thus provided. It will be understood by those skilled in the art that the maximum time to be measured will determine the counting capacity, and that longer times merely require the addition of another counter stage for each decade to be counted.

FIG. 3 also shows that all four outputs QA, QB, QC, QD, of each counter stage 70, 72 and 74 are connected to multiplexers 64, 66 and 68 and to parity checker/generators 76, 78, and 80, as well as to auxiliary output 9. In particular, it will noted that the QD outputs of counter units 74, 72 and 70, are connected by connecting lines 83, 85, and 87 to input terminals 1C1, 1C2 and 1C3 of third multiplexer 64, respectively. Similarly, the QC outputs of each counter unit are connected to the 2C1, 2C2 and 2C3 inputs of multiplexer 64, and the QB and QA outputs of main counter units 70, 72, and 74 are respectively connected to the 1C1, 1C2, and 1C3 and 2C1, 2C2, and 2C3 inputs of multiplexer 66. Provision is thus made for selection of individual output signals from counter units 70, 72, and 74 by the switch unit.

Before describing the remainder of the circuit of FIG. 3, reference is made to FIG. 4 which shows detail of digit scan counter 12. Counter 12 controls the indexing of multiplexers 60 through 68 by means of control signals S1 and S2 transmitted on connecting lines 16 and 18, respectively. As shown in FIG. 4, these signals are generated at the Q outputs of flip-flops 82 and 84 which form the first two stages of a three stage counter circuit. The three flip-flop stages, 82, 84 and 86 of digit scan counter 12 may be Dual J-K Master-Slave flip-flops with Preset and Clear. The input to first digital scan flip-flop 82 is provided on line 35 from AND gate 28, as was discussed previously, and is controlled by data entry cycle flip-flop 44. Clearing of all three counters, 82, 84, and 86 is accomplished by connection to line 54. The output of flip-flop 82, taken from the Q terminal, is supplied as switch control signal S1 to connecting line 16. The inverse of this output, $\overline{Q}$, is connected to the clock input of second flip flop 84. The Q output of flip-flop 84 is connected to line 18 and as switch control signal S2. Output signal $\overline{Q}$ of flip-flop 84 is connected to the clock input of flip-flop 86, whose Q output terminal supplies the reset signal transmitted by connecting line 42 to decade counters 70, 72, and 74 of main counter 10 and to one input of AND gate 27, for control of the transmission of clock pulses from clock 22 to the reset terminal of data entry flip flop 44. The $\overline{Q}$ output of flip flop 86 is connected to AND gate 34 for generation of the strobe pulse.

Referring back to FIG. 3, it will be seen that the input terminals 1C1, 1C2, and 1C3 of multiplexers 60 and 62 are all connected to a fixed supply voltage through a dropping resistor. A positive signal is thus transferred to any one of the multiplexer output terminals marked Bit 0, Bit 1, Bit 2, and Bit 3 when the internal switching logic of the associated multiplexer connects any of the input terminals to its output terminal 1Y or 2Y.

The fifth multiplexer 68 in electronic switch 8 chooses the parity and strobe signal outputs to be fed to display 6. Thus, parity signals, generated in parity checker/generators 76, 78, and 80, are transmitted on lines 90, 92, and 94 and to terminals 1C1, 1C2, and 1C3, respectively, of multiplexer 68. Similarly, strobe pulses generated on line 40 of monitor 4 are connected to terminals 2C1, 2C2, and 2C3 of multiplexer 68.

Connections from keyboard 2 are made by means of connecting lines 100 through 118, all of which are supplied via dropping resistors from the 5-volt system supply and are connected to the multiplexers as follows. Keyboard lines 100 and 102 are connected to input terminals 1C0 and 2C0 of multiplexer 60. Keyboard lines 104 and 106 are connected to input terminals 1C0 and 2C0 on multiplexer 62. Keyboard lines 108 and 110 are connected to input terminals 1C0 and 2C0 on mutliplexer 64. Keyboard lines 112 and 114 are connected to input terminals 1C0 and 2C0 on multiplexer 66, and keyboard lines 116 and 118 are connected to input lines 1C0 and 2C0 on multiplexer 68.

The purpose of the assembly of five multiplexer switches in electronic switch 8 is to determine whether the 8-bit character coded signals from keyboard 2 or from counter 10 will be transmitted to display 6. In normal operation, signals flow directly through the switches between keyboard 2 and display unit 6. When a time measurement cycle provided for by the monitoring arrangement of the invention is completed, these same switches serve to transmit simulated keyboard signals constituting the measurement data in 8 bit character coded signals from the response time monitor circuitry to display 6 for automatic display. At the same time, parity and strobe signals originating in the response time monitor are substituted for those normally transmitted from keyboard 2 on keyboard lines 116 and 118. The IBM equipment on which the response time monitor was fitted utilized EBCDIC (Extended Binary-Coded Decimal Interchange Code) character coded signals. In this code, only the last four digits are required for transmitting the numeric information from the response time monitor. Therefore, provision is made by means of three of the inputs to multiplexer 60 and 62 to substitute positive voltage signals for the Bit 0, Bit 1, Bit 2, and Bit 3 signals of the first four digits being fed in on keyboard lines 100, 102, 104 and 106, respectively. As was seen above, the Bit 4, Bit 5, and Bit 6, and Bit 7 inputs to multiplexers 64, 66, and 68 are supplied by the main counter unit.

Switch unit 8 provides the electronic equivalent of ten 2-pole, 4-position switches, all of which are simultaneously switched by switch signals S1 and S2 connected to the SA and SB terminals, respectively, of each multiplexer. Therefore, the input from keyboard 2, supplied via keyboard leads 100, 102; 104, 106; 108, 110; 112, 114; and 116, 118, to the 1C0 and 2C0 input terminals of the associated multiplexers, will be connected to display output lines Bit 0, Bit 1; Bit 2, Bit 3; Bit 4, Bit 5; and Bit 6, Bit 7, respectively, when no signals S1 or S2 are transmitted to the multiplexers on control lines 16 and 18. When activated by signals $S_1$ and $S_2$, the multiplexer switches transmit the simulated keyboard signals to the display unit.

Table 1, below, illustrates the correspondence between the logical state of control signals S1 and S2 and the choice of input signal switched to the output Y1 and Y2 of the electric switches. When both control signals S1 and S2 are at logical 0, the signals from the keyboard are fed directly to display unit.

TABLE I

SWITCHING OBTAINED WITH DIFFERENT CONTROL SIGNAL COMBINATIONS

| Logical State of Control Signal | | Input Signal Switched to Output | |
|---|---|---|---|
| S2 | S1 | Output Y1 | Output Y2 |
| 0 | 0 | 1C0 | 2C0 |
| 0 | 1 | 1C1 | 2C1 |
| 1 | 0 | 1C2 | 2C2 |
| 1 | 1 | 1C3 | 2C3 |

The relation between the states of the scan cycle counter flip-flops and the connections established in the multiplexers for sequential supply of time measurement related signals from the main counter to the display for production of decimal digits in the usual significance is shown in Table 2, below.

TABLE 2

SCAN CYCLE SEQUENCE

| Count | States of Cycle Scan Flip-flops | | | Switch Control Signals | | Description |
|---|---|---|---|---|---|---|
| | 82 | 83 | 84 | S2 | S1 | |
| 0 Before Cycle | Reset | Reset | Reset | 0 | 0 | Keyboard Connected to Display |
| 1 | Reset | Reset | Set | 0 | 1 | Tens Digit Fed to Display |
| 2 | Reset | set | Reset | 1 | 0 | Units Digit Fed to Display |
| 3 | Reset | Set | Set | 1 | 1 | Tenths Digit Fed to Display |
| 4 | Set | Reset | Reset | 0 | 0 | Keyboard Connected to Display |
| Cycle Terminated, Counting Stopped | Reset | Reset | Reset | 0 | 0 | |

The switching circuit provided by multiplexer 68 supplies the parity bit (even parity), and strobe signals required to complete the transfer of EBCDIC, character coded data to the display unit.

The keyboard signals, such as keyboard lock, shift control, and alarm signals, are routed to the display unit, along with power supply and ground circuit connections, via wiring in the interconnecting cables (not shown), as will be understood by those skilled in the art.

Operation of the circuit described above is as follows. Clock pulses from AND gate 26 are fed to first counter stage 70 in main counter 10. When tenths counter 70 changes from a count of 9 to 0, the transition of the high order bit signal, QD, is coupled to the input of counter stage 72, causing it to advance one count. Similarly, the QD signal from second stage 72 drives third counter stage 74. The outputs of these counters are fed to the input terminals of multiplexers 64 and 66 for selection to form the lower order bits of the 8-bit EBCDIC code. As was discussed above, the high order bits of the EBCDIC code are supplied by multiplexers 60 and 62.

When a count has been completed, the four lower bits of accumulated value in three stage main counter 10 are sequentially switched, as shown in Table 2, under control of sequential signals S1 and S2 from digit scan counter 12. Their outputs are switched to the C1, C2, and C3 multiplexer input connections.

Parity scanner/generators 76, 78 and 80 generate required parity bits for the BCD outputs of main counter stages 70, 72 and 74 respectively. These are fed to the 1C inputs of electronic multiplexer switch 68, which provides sequential selection of the parity signal associated with each digit selected during the data entry cycle.

At the end of the response time interval, the keyboard lock signal returns to high level. This causes AND gate 26 to inhibit the clock pulses which were driving main counter 10, and marks the beginning of the data entry cycle. During the data entry cycle, the response time measurement stored in main counter 10 is scanned into display 6 instead of the normal keyboard signal. To this end data entry cycle flip-flop 44 is set by the positive level transition at its clock input. Flip-flop 44, once set, cannot be reset until a low level signal is applied at its reset input. Flip-flop 44 is normally in the reset state, with its Q output at low level and its $\overline{Q}$ output at high level. The feedback signal from the Q output is inverted by inverting amplifier 53 and fed to one input of AND gate 52. The other input of AND gate 52 is connected to the keyboard lock signal via non-inverting driver 49.

When both inputs to AND gate 52 are high, the high output produced is fed to the clock input of data entry cycle flip-flop 44, switching it to the set condition and causing its Q output to go high. The inverted feedback signal from the Q output then inhibits further input transitions, keeping flip-flop 44 in this condition until it is reset at the end of the scan cycle.

Sequential scanning of the three response time digits is controlled by digit scan counter 12. Initially, the Q outputs of scan flip-flops 82, 84 and 86 are at a logic 0 or low voltage level. When data entry cycle flip-flop 44 is in the set position, AND gate 28 is enabled and passes counting pulses to the input of the first counter, flip-flop 82. The counting pulses appear during positive going cycles of clock 22 when a true condition occurs at the input of AND gate 28. The first three counts advance the first two stages of the counter and produce switching control signals S1 and S2 which are transferred by lines 16 and 18, respectively, and control the operation of multiplexer switches 60, 62, 64, 66 and 68. This results in sequential selection of the BCD signal outputs in main counter 10 for transmission to the display.

When the keyboard is in operation, the strobe pulse from the keyboard gates the keyboard data signals into the display immediately after each new character code is produced by depressing a key. In order to prevent premature data entry by the operator after occurrence of the systems ready signal on the display, generation of the strobe signal is delayed by one-half clock cycle. This is accomplished as follows. The positive pulses from AND gate 28 occur during the positive half of the clock cycle. The signal fed to strobe generator 38 is inverted by inverter 39 and so provides positive-going pulses during the second half of the clock cycle which are coupled through NAND gate 34. With both its inputs high, NAND gate 34 has a low output. The $\overline{Q}$ signal from third stage flip-flop 86 of digit scan counter 12 which is fed to the other input of NAND gate 34 is normally high during the first three cycles of scan counter 12. Thus, one input of NAND gate 34 is enabled. Due to the inversion of pulses supplied from inverter 39, the output of NAND gate 34 goes low during the second half of the clock cycle and remains so until the $\overline{Q}$ output of third stage flip-flop 86 changes to low.

The net result of the gating circuitry just described is to provide a pulse which occurs in the second half of clock cycles occurring during the first three counts of digit scan counter 12. This interval is called the strobe interval. The logic level of the strobe interval pulse is inverted by inverter 36 and supplied to one-shot multivibrator 38, which is designed to produce a negative-going pulse of 5 milliseconds duration at the leading edge of the strobe interval. This strobe pulse is fed to the 2C inputs of electronic multiplexer 68 to provide the required strobe pulse for display 6, after selection of each digit. Immediately after the fourth pulse fed to the digit scan counter 12, the positive transition of output Q of third counter 86 causes the master reset to occur before the strobe pulse. This master reset pulse is supplied by line 42 to all main counter and digit scan counter stages as well as to data entry cycle flip-flop 44, resetting them. The path of the reset signal through AND gate 27 and inverter stage 29 provides noise immunity and level inversion for signals to be supplied to the "clear" input of data entry cycle flip-flop 44.

It will be noted that, in addition to connections to the BCD outputs of main counter stages 70, 72, and 74, the auxiliary output is also provided with a strobe pulse connection to facilitate operation of an attached printer, for example.

In an alternative embodiment of the invention, a single parity generator is connected across the output signals from electronic switches 60, 62, 64, 66, and 68. In this way a keyboard fail indicator can be added as a parity generator, which will also generate a parity bit for signals fed to the display unit from the keyboard. The parity bit generated in this way is compared with the parity signal from the keyboard to check the integrity of data flowing through the monitor from the keyboard to the display.

The process described above can be used with equal facility to measure the interval between operations and to provide a direct measurement, for example, of time chargeable to overhead. Inversion of the keyboard lock signal supplied to switch 46 will result in initiation of a timing measurement by the restoration of keyboard control to the operator. Thus when the keyboard signal from keyboard 2 goes low, releasing the keyboard to the operator, inverter 120 supplies a positive keylock signal, permitting clock pulses to flow from clock 22 to counter 10. Similarly, when the keyboard signal goes high at the time the "Enter" command is given at keyboard 2, the counting operation is stopped and the data entry cycle begun. The necessary change in circuitry to produce this result is shown in FIG. 2 by the dashed lines.

It will be apparent to those skilled in the art that the principles of the invention, as illustrated in the present embodiment in connection with a particular Interactive Terminal in a computer, can be utilized with a variety of input and output units, either with the computer described above or with other computers, by utilizing process related control signals passing between the computer and the terminal to activate the timer and to generate time measurement reporting signals which are compatible with those already in use for communicating between the terminal keyboard or other input and the display. Therefore, the below appended claims should be construed in keeping with the spirit of the invention, rather than limited to the illustrative embodiment described above.

What is claimed is:

1. An apparatus for measuring the interactive performance of a computer system including a computer and at least one computer terminal without dependence upon the programming of the computer, the computer terminal comprising a keyboard, a display, and a storage from which signals can be transferred to at least one of the display and the computer, the keyboard providing at least one of input data signals and control signals in a coded format to the storage, and the terminal and the computer being adapted to exchange data signals and control signals, the apparatus being adapted to receive at least one signal from the computer terminal and to transmit at least one measurement signal to the computer terminal and to be coupled to the computer terminal, and comprising:

a timer;

means responsive to a signal in the computer terminal generated in response to a signal from the keyboard for activating the timer and generating measurement data signals related to at least one of the time required for the computer system to complete an operation initiated at the terminal and the time between successive operations initiated at the terminal; and means coupled to the timer and adapted to be coupled to the storage in the computer terminal for encoding the measurement data signals in the coded format of the keyboard and for transferring the coded measurement data signals in sequence with signals from the keyboard into the storage from which the coded measurement data signals can be transferred to the computer terminal display for visual display and/or to the computer for processing or storage.

2. An apparatus in accordance with claim 1 in which said signal in the computer terminal is a signal for preventing operation of the keyboard from affecting the computer system and generated by the computer terminal when a keyboard function key has been activated.

3. An apparatus in accordance with claim 2 and further comprising:

means responsive to a said signal in the keyboard which is generated subsequent to generation of the keyboard operation preventing signal that activates the timer for initiating operation of the encoding and transferring means when a measurement has been completed.

4. An apparatus in accordance with claim 3 in which the signal for initiating operation of the encoding and transferring means is the termination of the keyboard operation preventing signal to again enable operation of the keyboard to affect the computer system.

5. An apparatus in accordance with claim 1 in which the timer comprises a clock pulse generator, a counter coupled to the clock pulse generator for accumulating and storing clock pulses, and in which the means for activating the timer starts and stops accumulation of pulses in the counter.

6. An apparatus in accordance with claim 5 in which the means for activating the timer is responsive to said signal in the computer terminal for starting accumulation of pulses in the counter and to a signal from the computer for stopping accumulation of pulses in the counter.

7. An apparatus in accordance with claim 6 in which said signal in the computer terminal for starting accumulation of pulses is the presence of a signal which prevents operation of the keyboard from affecting the computer system, and the computer signal for stopping accumulation of pulses is the absence of the keyboard operation preventing signal for again enabling operation of the keyboard.

8. An apparatus in accordance with claim 6 in which the means for encoding and transferring measurement data signals includes a multiple position switch for selecting an output from the keyboard or an output from the counter.

9. An apparatus in accordance with claim 8 in which the multiple position switch includes a multiplexer.

10. An apparatus in accordance with claim 8 and including means for sequencing the multiple position switch to encode the measurement data signals in decimal sequence.

11. An apparatus in accordance with claim 10 in which the means for sequencing includes a counter for generating binary control signals for the multiplexer.

* * * * *

UNITED STATES PATENT AND TRADEMARK OFFICE
CERTIFICATE OF CORRECTION

PATENT NO. : 4,369,493

DATED : January 18, 1983

INVENTOR(S) : Allan A. Kronenberg

It is certified that error appears in the above-identified patent and that said Letters Patent are hereby corrected as shown below:

Column 12, line 3, delete "Claim 6" and insert --Claim 5--

Signed and Sealed this

Twenty-seventh Day of March 1984

[SEAL]

Attest:

GERALD J. MOSSINGHOFF

Attesting Officer

Commissioner of Patents and Trademarks